United States Patent [19]
Wood

[11] 3,895,166
[45] July 15, 1975

[54] BONDED REINFORCED STRUCTURES USING AMINE RESINS

[75] Inventor: Louis L. Wood, Rockville, Md.

[73] Assignee: W. R. Grace & Co., New York, N.Y.

[22] Filed: Feb. 13, 1973

[21] Appl. No.: 332,054

Related U.S. Application Data

[63] Continuation-in-part of Ser. No. 284,023, Aug. 28, 1972, which is a continuation-in-part of Ser. No. 252,793, May 12, 1972.

[52] U.S. Cl. ............ 428/383; 156/110 A; 156/330; 156/331; 156/335; 260/29.2 EP; 260/29.2 N; 260/29.3; 260/78 SC; 260/841; 428/295; 428/378; 428/390; 428/392; 428/393; 428/395

[51] Int. Cl.² ... B29H 9/02; B29H 9/04; B29H 9/08; B32B 25/02

[58] Field of Search ............ 260/29.2 EP, 29.3, 841, 260/29.2 N, 78 SC; 161/143, 144, 175, 176; 156/110 A, 330, 331, 335

[56] References Cited
UNITED STATES PATENTS

| | | | |
|---|---|---|---|
| 2,375,261 | 5/1945 | Taylor et al. | 156/110 A |
| 2,570,895 | 10/1951 | Wilson | 156/110 A |
| 2,746,897 | 5/1956 | Röder et al. | 161/144 |
| 2,926,154 | 2/1960 | Keim | 260/29.2 EP |
| 3,039,889 | 6/1962 | Keim | 260/29.2 EP |
| 3,231,412 | 1/1966 | Pruitt et al. | 156/110 A |
| 3,240,761 | 3/1966 | Keim et al. | 260/29.2 EP |
| 3,247,048 | 4/1966 | Gaertner | 156/110 A |
| 3,251,852 | 5/1966 | De Groote et al. | 260/29.2 EP |
| 3,308,007 | 3/1967 | Shepard | 156/110 A |
| 3,338,858 | 8/1967 | Strasser et al. | 260/29.2 EP |

*Primary Examiner*—George F. Lesmes
*Assistant Examiner*—Charles F. Lipsey
*Attorney, Agent, or Firm*—Eugene M. Bond

[57] ABSTRACT

The invention disclosed is for integral reinforced structures of elastomeric materials using curable amine resin compositions derived from particular polyamine epichlorohydrin adducts. The amine resin compositions are highly effective for bonding reinforcing assemblies with an elastomeric material into an integral product.

4 Claims, No Drawings

3,895,166

BONDED REINFORCED STRUCTURES USING AMINE RESINS

This application for U.S. Letters patent is a continuation-in-part of application Serial No. 284,023, filed August 28, 1972 which in turn is a continuation-in-part of application Serial No. 252,793, filed May 12, 1972.

This invention relates to bonded structures of elastomeric materials and reinforcement assemblies of filaments and/or cords using a defined cationic amine resin composition. More particularly, the present invention provides a new improved method for bonding reinforcement assemblies of filaments and/or cords to elastomeric structures using amine resin compositions derived from water soluble polyamine epichlorohydrin adducts.

Use of reinforcing fibers and filaments including generally strands, cords, ropings and the like into an elastomeric matrix is well known. Many structures are prepared using these reinforcing techniques, including, for example, tires, hoses, belts, gaskets and the like.

Cotton fiber has been used as a reinforcement structure primarily because of its numerous fiber ends, good mechanical bonding was realized without great need for adhesive. Rayon on the other hand requires a resorcinol/formaldehyde/styrenebutadiene latex (RFL) adhesive whereas polyamides, i.e., nylon, require styrene-butadine latex modified by vinyl pyridine in order to achieve satisfactory adhesion and bonding.

A number of means are available for adhesion of polyester cord, e.g., Dacron; and metal cord, i.e., steel, in elastomeric systems. In polyester reinforced systems, for example, most of the proposed methods require an aqueous double dip, the first dip being an aqueous dispersion of epoxy resin and a blocked isocyanate with the second dip being a standard resorcinol/formaldehyde/latex (RFL) combination used for polyamides.

Several different theories have been advanced for the mechanism of cord-elastomer adhesion. Generally, these theories are based on formation of covalent bonds between the adhesive-cord and the adhesive-elastomer. Another theory is that the adhesive serves to bridge between the high modulus cord and the low modulus elastomer. In brassed steel cords, the formation of a bond between rubber and the brass coating of the steel cord is believed to be due to sulfur linkages between the vulcanizate and copper in the steel coating.

Uncured thermosetting cationic resins are known such as those comprising a water-soluble polymeric reaction product of epichlorohydrin and a polyamide derived from a polyalkylene polyamine and a saturated aliphatic dibasic carboxylic acid containing 3 to 10 carbon atoms. These resins are applied to fibrous cellulosic materials such as paper pulp for the purpose of imparting wet strength during processing thereof.

It has now been found surprisingly, however, that in the complex art of bonding elastomeric materials to reinforcement assemblies of filaments and/or cords, uncured thermosetting cationic resins such as those used heretofore for cellulosic wet strength benefits prove especially effective as an adhesives component.

Generally stated, the present invention thus provides new improved integral reinforced structure of elastomeric material using curable amine compositions derived from particular polyamine epichlorohydrin adducts. The resultant adduct of non-crosslinked polyamines may then be disposed onto a filament or cord as desired and cured. Curing may be several modes such as by use of a crosslinking agent; by application of external energy such as heat, oxidative environments and the like; while accompanied by removal of the reaction moderating solvent to effect curing. The cured crosslinked adhesives are characteristically tough, abrasion resistant resins having excellent utility in bonding various cords to elastomeric materials.

Elastomeric materials usefully employed herein may be any of those known in the art. This elastomeric material includes, for example, conventionally compounded sheets and coatings of natural rubber or such known synthetic rubbers or elastomers as neoprene, butyl, nitriles (Buna N), styrene-butadiene (SBR), acrylonitrilebutadiene-styrene (ABS) and the like.

The latex or latex mixture used herein will depend on the type of material to be bonded. For example, when natural rubber or a synthetic rubber of the styrene-butadiene type is used, the latex is preferably a butadiene-styrene-vinyl pyridine terpolymer latex with or without the addition of butadiene-styrene copolymer latex and/or natural rubber latex. When neoprene rubber is to be bonded, the latex is preferably a neoprene latex while for buna N bonding, a butadiene-acrylonitrile copolymer latex is preferred. Similarly, optimum bonding is obtained with a neoprene latex, with or without the addition of butadiene-styrene copolymer latex, when chlorosulphonated polyethylene (Hypalon) or butyl rubber is used.

The polyamides used in the preparation of the cationic thermosetting resins of the present invention are those whose basicity is due primarily to the presence of amino groups.

These basic polyamides may be prepared by reacting a polyamine containing at least three amino groups, with a saturated aliphatic dicarboxylic acid such as adipic acid and suberic acid, or with diglycolic acid. Blends of two or more of these dicarboxylic acid may also be used, as well as blends of one or more of these with higher saturated aliphatic dicarboxylic acids as long as the resulting longchain polyamide is water-soluble or at least water-dispersible.

The polyamine reactant should have at least three amino groups. Typical polyamines of this type suitable for use as hereinabove described are diethylene triamine, triethylene tetramine, tetraethylene pentamine, methyl bis(3-aminopropyl) amine, methyl bis(2-aminoethyl) amine, N-(2-aminoethyl) piperazine, 4,7-dimethyltriethylenetetramine and so on.

The temperatures employed for carrying out the reaction between the dicarboxylic acid and the polyamine may vary from about 110°C. to about 250°C. or higher at atmospheric pressure. For most purposes, however, temperatures between about 160°C. and 210°C. have been found satisfactory and are preferred. Where reduced pressures are employed, somewhat lower temperatures may be utilized. The time of reaction depends on the temperatures and pressures used and will ordinarily vary from about 1 to about 4 hours, although shorter or longer reaction times may be utilized depending on reaction conditions. In any event, the reaction is desirably continued to substantial completion for best results.

In carrying out the reaction, it is preferred to use an amount of dicarboxylic acid sufficient to react substantially completely with at least two amine groups of the polyamine.

Polyamides suitable for use herein may also be prepared from the long-chain polyamides described in U.S. Pat. No. 2,926,154 by alkylating secondary amine groups of such long-chain polyamides to tertiary amine groups using alkyl halides, such as methylchloride and ethyl bromide, dimethyl sulfate, diazomethane, benzyl chloride or other suitable alkylating agent. The disclosure of U.S. Pat. No. 2,926,154 is incorporated herein by reference.

In converting the polyamide formed as above described to a cationic thermosetting resin, it is reacted with epichlorohydrin at a suitable temperature, i.e., at a temperature from about 25°C. to about 110°C., until the viscosity of the 50 percent solid solution at 25°C. has reached either about 2,500 or higher centipose (Brookfield No. 4 spindle); or if 25 percent solids reactant is used, a viscosity of about 300 centipose, similar basis, is sufficient. This reaction is preferably carried out in aqueous solution to moderate the reaction. The reaction may also be moderated by decreasing the pH of the aqueous polyamide solution with acid prior to addition of epichlorohydrin or immediately after the addition of epichlorohydrin. This adjustment is usually made to pH 8.5–9.5, but may be made to pH 7.5 in some cases with quite satisfactory results.

When the desired viscosity is reached, sufficient water is then added to adjust the solids content of the resin solution to about 60 percent or less, and preferably about 10 percent to about 30 percent, the product cooled to about 25°C. and then stabilized by adjusting the pH to about 3.0 to 8.0 and preferably to about 5.0 to 6.0. In some cases, pH adjustment will not be necessary at all since the final pH of the product will fall within the desired range.

A variety of polyalkylene polyamines including polyethylene polyamines, polypropylene polyamines, polybutylene polyamines and so on may be employed herein. The polyethylene polyamines represent an economically preferred class. More specifically, the polyalkylene polyamines are polyamines containing two primary amine groups and at least one secondary amine group in which the nitrogen atoms are linked together by groups of the formula $-C_nH_{2n}-$ where n is a small integer greater than unity and the number of such groups in the molecule ranges from two up to about eight and preferably up to about four. The nitrogen atoms may be attached to adjacent carbon atoms in the group $-C_nH_{2n}-$ or to carbon atoms further apart, but not to the same carbon atom.

This method contemplates not only the use of such polyamines as diethylenetriamine, triethylenetetramine, tetraethylenepentamine, dipropylenetriamine, and the like, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylenediamine, is a very satisfactory starting material. Most preferred are the polyethylene polyamines containing from two to four ethylene groups, two primary amine groups, and from one to three secondary amine groups.

Thus, polyalkylene polyamine refers to and includes any of the polyalkylene polyamines referred to above or to a mixture of such polyalkylene polyamines.

It is desirable, in some cases, to increase the spacing of secondary amine groups on the polyamide molecule in order to change the reactivity of the polyamide-epichlorohydrin complex. This can be accomplished by substituting an aliphatic diamine such as ethylenediamine, propylenediamine, hexamethylenediamine or a heterocyclic diamine such as piperazine or the like for a portion of the polyalkylene polyamine. For this purpose up to about 60% of the polyalkylene polyamine may be replaced by a molecularly equivalent amount of the diamine. Usually a replacement of about 30% or less will serve the purpose.

In the polyamide-epichlorohydrin reaction, it is preferred to use sufficient epichlorohydrin to convert all secondary amine groups to tertiary amine groups and/or quaternary ammonium groups including cyclic structures. However, more or less may be added to moderate or increase reaction rates. In general, it is contemplated to use from about 0.5 mole to about 1.8 moles of epichlorohydrin per mole polyamide. It is preferred to utilize from about 0.9 mole to about 1.5 moles of epichlorohydrin per mole of polyamide.

The adhesive systems of the present invention are particularly useful as bonding agents for non-woven and woven natural or synthetic fibers and fabrics; cords, yarns, strands, ropes, filaments and the like; plastics, metals, and glasses; as crosslinking agents for various other resins including epoxy resins, isocyanated, carboxylated, and halogenated polymers; and as functional additives to conventional cord-elastomeric adhesives such as especially those used for tire cords presently. Tire elastomers of particular merit are those comprising styrene/butadiene copolymers, polybutadiene, polyisoprene, natural rubber, ethylene/propylene copolymers, and ethylene/propylene/nonconjugated diene multipolymers.

In bonding polyester tire cord to rubber, the aqueous polyureas adhesives of this invention can be used either in a one-step dip, i.e., the polyureas adhesive is added to the RFL or modified RFL formulation prior to treatment of the cords, or by a two-step dip in which the polyureas adhesive is used in a first dip which acts as a tie coat for a second conventional RFL dip.

The following examples will aid in explaining, but should not be deemed as limiting, practice of the present invention.

EXAMPLE 1

SBR (styrene-butadiene-rubber) was compounded according to ASTM D15-59T for sample preparation for physical testing of rubber products using the following recipe:

| Ingredients | Parts by Weight |
| --- | --- |
| SBR 1502 (General Tire & Rubber Co.) | 100 |
| Zinc Oxide | 5 |
| Sulfur | 1.5 |
| MBTS (Altax by R. T. Banderbilt Co.) | 1.75 |
| PC Black (Spheron 9 by Cabot Corp.) | 40 |

The prepared rubber was sheeted on a two-roll mill and stored at 0°C. to prevent premature vulcanization.

EXAMPLE 2

EPDM (Ethylene-propylene-diene monomer) rubber was compounded according to the procedure outlined in DuPont booklet, Nordel, April 1964, p. 8, using the following recipe:

| Ingredients | Parts by Weight |
| --- | --- |
| EPDM (Nordel 1070 by DuPont) | 100 |
| HAF Black (Vulcan by Cabot Corp.) | 80 |
| Zinc Oxide | 5 |
| Process Oil (Shellflex 411 by Shell) | 40 |
| Tetramethylthiuram disulfide | 0.75 |
| Mercaptobenzothiazole (MBT) | 1.5 |
| Sulfur | 2 |
| Dipentamethylenethiuram tetrasulfide | 0.75 |

Again, the prepared rubber was sheeted on a two-roll mill and stored at 0°C. to prevent premature vulcanization.

EXAMPLE 3

RFL adhesives were generally according to Moult, Bonding Textiles to Rubber, Chap. 42, Handbook of Adhesives, Reinhold Pub. Co., 1962, using the following:

I. Resorcinol-formaldehyde solution (F:R mole ratio = 2.5):

| | % active | g active | g total |
| --- | --- | --- | --- |
| Resorcinol | 100 | 21.5 | 21.5 |
| Formaldehyde | 36.9 | 14.6 | 39.6 |
| NaOH, 10% W/W | 10.0 | 1.3 | 13.0 |
| Water, distilled | — | — | 299.9 |
| | 10.0 | 37.4 | 374.0 |

The NaOH, resorcinol, and formaldehyde were added in that order to the water with stirring. The solution was stirred for 4 hours with cooling to keep the temperature at 15°–25°C.

II. RFL adhesive:

| | % active | g active | g total |
| --- | --- | --- | --- |
| Latex | t | 143.0 | (143)(100/t) |
| Water, distilled | — | — | 626−(143)(100/t) |
| RF solution (I) | 10.0 | 37.4 | 374 |
| | 18.0 | 180.4 | 1000 |

The latex t containing 8 percent solids was added to the water with stirring. This diluted latex was added to the RF solution (I) with stirring, and the mixture allowed to age overnight before use. Generally, the RFL adhesives were then used within 3 days.

Additives to the RFL were generally added after aging, and water content was adjusted to keep the overall concentration at 18 percent.

EXAMPLE 4

2.18 moles of diethylenetriamine and 100 grams of water were placed in a 3-necked flask equipped with a mechanical stirrer, thermometer and condenser. To this was added 2.0 moles of adipic acid. After the acid had dissolved in the amine, the solution was heated to 185°–200°C. and held there for 1½ hours. Vacuum was applied to the flask during the period required for the contents of the flask to cool to 140°C. following which 430 grams of H$_2$O was added.

To 60 grams of this polyamide solution was added 225 grams of H$_2$O. This solution was heated to 50°C. and 12.5 grams of epichlorohydrin was added dropwise over a period of 10 minutes. The contents of the flask were then heated to 60°–70°C. for 20 minutes. 150 grams of H$_2$O was added to the product, and it was cooled to 25°C. HCl was then added to adjust the pH to 5.0.

EXAMPLE 5

A polyamide was prepared from 2.18 moles of triethylenetetramine and 2.0 moles of adipic acid according to the procedure described in Example 4. 60 grams of the polyamide solution was dissolved in 225 grams of H$_2$O. This solution was stirred mechanically and heated to 50°C. Twenty-five grams of epichlorohydrin was added dropwise over a period of three minutes. The solution was then heated to 60°–70°C. for 15 minutes after which it was diluted with 225 grams of H$_2$O, cooled to 25°C. and adjusted to pH 5.0 with HCl.

EXAMPLE 6

A polyamide was prepared according to the procedure given in Example 4 using 2.18 moles of diethylenetriamine and 1.5 moles of adipic acid and 0.5 mole of azelaic acid. Fifty-seven and one half grams of the polyamide solution were dissolved in 115 grams of H$_2$O and heated to 50°C. To this was added 15 grams of epichlorohydrin over a period of 6 minutes. This solution was then heated at 60°–70°C. for 20 minutes after which 150 grams of H$_2$O were added and the product was cooled to 25°C. The solution was adjusted to pH 5.0 by adding HCl.

EXAMPLE 7

Polyester tire cord (1260/2) was stretched across an aluminum frame and dipped in 1000 ml. of the product solution from Example 6. The sample was then dried at 110°C. for 20 minutes and dipped in the RFL preparation of Example 3. After drying again at 110°C. for 20 minutes, the sample was imbedded with SBR rubber compound of Example 1 on a ¼ inch H-test frame (ASTMD 2138-67). The sample was then cured for 30 minutes at 150°C. The cord pullout strength at 23°C. was 19 pounds. By contrast, when the RFL was used alone, the pullout value was 11 pounds.

EXAMPLE 8

Example 7 was repeated except that the product solution (500 ml.) from Example 5 was admixed with RFL adhesive (1000 ml.) from Example 3 prior to dipping of the polyester cord. After dipping, drying, imbedding and curing, the cord pullout strength was measured and found to be greater then 15 pounds. Corresponding results were realized using the composition of Example 4.

EXAMPLE 9

The procedures of Examples 7 and 8 were repeated except using as the tire cord, both polyamide (nylon 6,6) and Fiber B, a trademarked product by du Pont de Nemours for a modified polyamide tire cord. Comparable results were realized. Also, it was noted that placements of the tire cord in bias, radial, or bias belted configurations resulted in good adhesion indicating that the particular configurations were not critical for adhesion using the present compositions.

EXAMPLE 10

Melt-spun steel fiber tire cord was stretched across an aluminum frame and dipped in 1000 grams of product solution used in Example 6. The dipped product was dried at 130°C. for 10 minutes after which it was dipped into styrene-butadiene-vinyl pyridine latex having about 20 percent solids. The product was next dried, and then embedded with EPDM rubber compound from Example 2 on a ¼ inch H-test frame using the general procedure ASTMD 2138-67. The sample was cured for about 20 minutes at about 160°C. Cord pullout strength at 23°C. was found to be greater than 15 pounds. Similar results were realized using rayon fiber cord in place of the steel cord of this example.

Although the present resin composition generally is applied to the cord by dipping, it may also be applied during spin finishing, weaving or twisting operations.

In processing metal cords, it is useful to first shot blast the cord, clean the blasted cord with a suitable solvent especially for grease or oil removal, and thereafter apply the adhesive. A useful metal cord is brassed steel ($1 \times 3 + 5 \times 7 + 1) \times 0.0059$ kn, with a brass coating of 70/30 copper/zinc ratio. It will thus be apparent that the present invention may be usefully applied to reinforcement assemblies comprising glass, metal and polymeric cords.

It is to be understood that the foregoing detailed description is given merely by way of illustration and that many variations may be made therein without departing from the spirit of this invention.

What is claimed is:

1. In an integral elastomeric composite reinforced structure wherein a filamentary reinforcement assembly is adhesively secured to and within an elastomeric matrix structure by an adhesive, the improvement which consists essentially of an adhesive consisting essentially of the combination of resorcinol - formaldehyde - latex adhesive dip and an aqueous solution of polyamide - polyamine - epichlorohydrin adduct, said polyamide - polyamine being formed by reaction of a polyamine having at least three amino groups per molecule and a saturated aliphatic dicarboxylic acid containing 3 to 10 carbon atoms at a reaction temperature of about 110°C. to about 250°C., the amount of said saturated aliphatic dicarboxylic acid being sufficient to react with at least two amine groups of the polyamine, the polyamide - polyamine being further reacted with epichlorohydrin at a temperature from about 25°C. to about 110°C. in an aqueous solution and at a pH of 7.5 to 9.5, the amount of epichlorohydrin being about 0.5 mole to about 1.8 moles of epichlorohydrin per mole polyamide, the solution of polyamide - polyamine - epichlorohydrin being adjusted to a solid content of less than about 60% to about 10 % and a pH of about 3 to about 8, said adhesive being applied to the filamentary reinforcement prior to bonding within the elastomeric matrix, and wherein the filamentary reinforcement assembly is selected from the group consisting of glass, metal, rayon, polyester and polyamide.

2. The combination of claim 1 wherein the saturated aliphatic dicarboxylic acid is selected from the group consisting of adipic acid, suberic acid and azelaic acid.

3. The combination of claim 1 wherein the reaction temperature of dicarboxylic acid and polyamine is between about 160°C. and 210°C., the pH of the polyamide - polyamine - epichlorohydrin reaction is about 8.5 − 9.5, the adjusted pH is about 5.0 to 6.0, and the moles of epichlorohydrin to polyamide is about 0.9 to about 1.5.

4. The combination of claim 1 wherein the polyamine is selected from the group consisting of diethylene triamine, triethylene tetramine, tetraethylene pentamine, methyl bis(3-aminopropyl) amine, methyl bis(2-aminoethyl) amine, N-(2-aminoethyl) piperazine, 4,7-dimethyltriethylenetetramine and the like.

* * * * *